United States Patent [19]

Pernia

[11] Patent Number: 4,938,011
[45] Date of Patent: Jul. 3, 1990

[54] LAWN MOWER ATTACHMENT FOR SHREDDING AND PULVERIZING
[76] Inventor: Nicholas L. Pernia, 3029 Wood Rd., Erie, Mich. 48133
[21] Appl. No.: 310,416
[22] Filed: Feb. 13, 1989
[51] Int. Cl.⁵ ............... A01D 34/73; A01D 67/00
[52] U.S. Cl. ............................ 56/255; 56/320.2
[58] Field of Search ............... 56/13.7, 13.8, 17.5, 56/255, 295, 320.1, 320.2

[56] References Cited
U.S. PATENT DOCUMENTS

| 2,659,191 | 11/1953 | Miller et al. | 56/12.9 |
|---|---|---|---|
| 2,836,024 | 5/1958 | Davis et al. | 56/255 |
| 2,983,096 | 5/1961 | Phelps | 56/255 |
| 3,242,660 | 3/1966 | Gary | 56/255 |
| 3,531,923 | 10/1970 | De Lay | 56/17.5 |
| 3,538,692 | 11/1970 | Cope et al. | 56/295 |
| 3,884,020 | 5/1975 | Dahl et al. | |
| 4,083,166 | 4/1978 | Haas | 56/13.7 |
| 4,189,903 | 2/1980 | Jackson et al. | 56/295 |
| 4,189,904 | 2/1980 | Parker | 56/255 |
| 4,205,512 | 6/1980 | Thorud | 56/13.7 |
| 4,306,409 | 12/1981 | Wulfers | 56/255 |
| 4,318,268 | 3/1982 | Szymanis | 56/255 |
| 4,435,949 | 3/1984 | Heismann | 56/320.2 |
| 4,679,383 | 7/1987 | Ouintel | 56/255 |

FOREIGN PATENT DOCUMENTS 1584495  2/1981  United Kingdom ............... 56/320.1

Primary Examiner—Bruce M. Kisliuk
Attorney, Agent, or Firm—Dykema Gossett

[57] ABSTRACT

An attachment for a conventional lawn mower provides shredding or pulverizing of lawn materials, including leaves, limbs and the like. The attachment includes an arcuate closure wall secured to the cutting blade housing of the lawn mower over the discharge opening in the housing. The attachment includes a plurality of cutting members arranged in preselected groups thereof. Each cutting member includes a plurality of radially extending cutting elements which are configured so as to be self-cleaning and effect pulverizing or shredding of the lawn material. The placement and positioning of the cutting members on the closure wall may be readily varied.

21 Claims, 2 Drawing Sheets

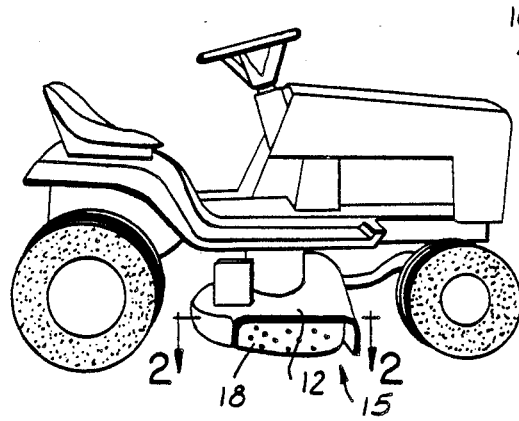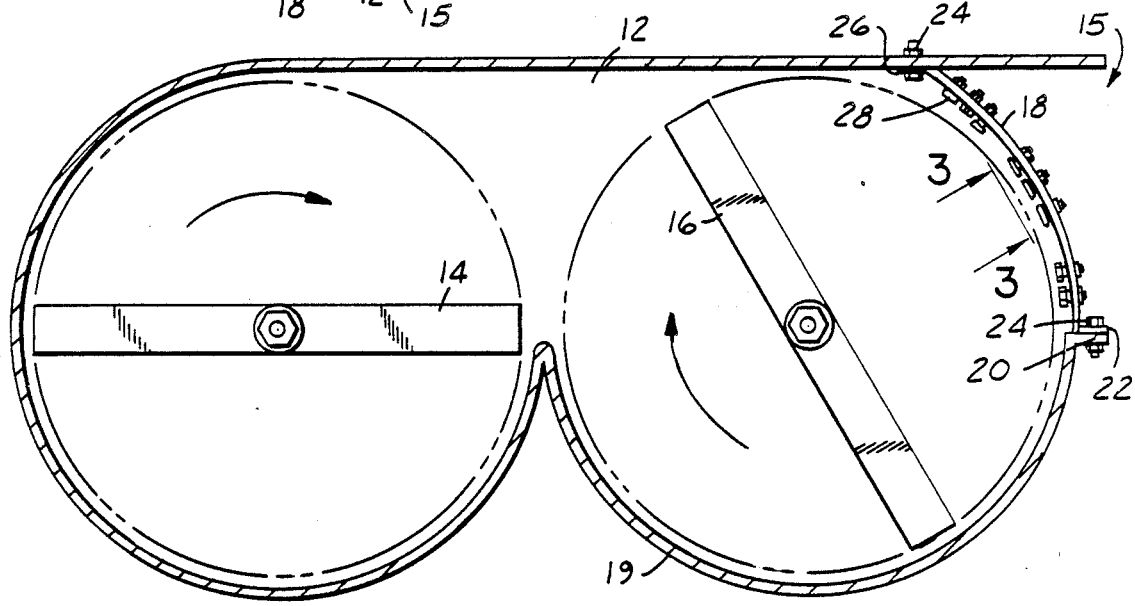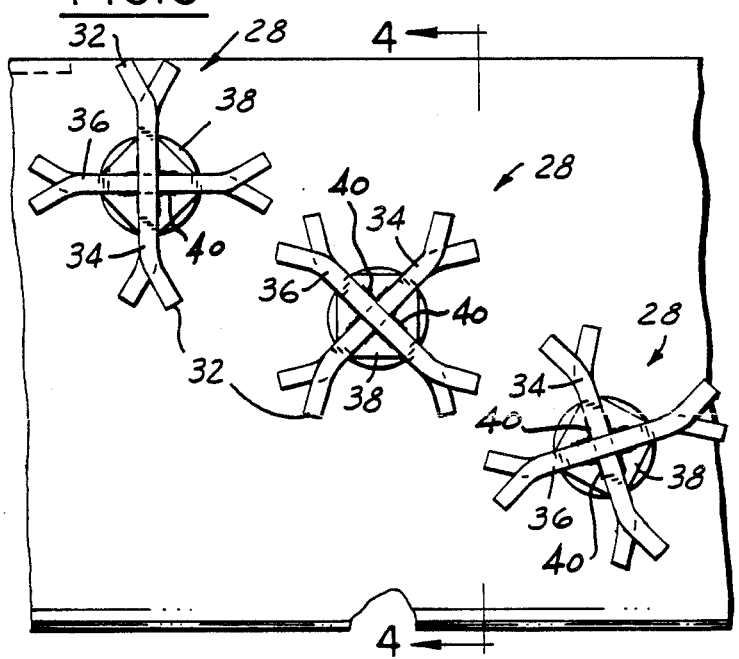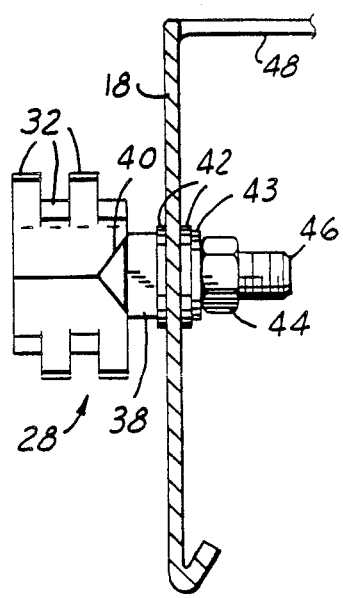

LAWN MOWER ATTACHMENT FOR SHREDDING AND PULVERIZING

TECHNICAL FIELD

The present invention generally relates to agricultural cutting apparatus such as lawn mowers, and deals more particularly with an attachment suitable for use with a conventional lawn mower for pulverizing or shredding lawn material.

BACKGROUND OF THE INVENTION

The art is replete with various kinds of devices for mulching leaves and other lawn material. Some of these devices, as exemplified by U.S. Pat. Nos. 3,242,660; 3,531,923; and 4,189,904 comprise attachments for converting a conventional lawn mower into a mulcher. There also exist lawn mowers which, by their designs, are specially configured for dedicated mulching operation.

Several problems exist with respect to attachments known in the prior art for converting conventional lawn mowers to mulchers. For example, while these prior devices may be entirely suitable and highly effective in mulching leaves, the mulched material is often quite coarse in consistency, and thus tends to lie on top of the lawn and/or accumulate in piles. This may, in some cases, be unsightly and in any event the mulched material is not dispersed uniformly over the lawn and cut into sufficiently fine particles which find their way through the grass onto the soil.

Prior art mulcher attachments are also highly ineffective in cutting other types of lawn material, such as small limbs, nuts and pinecones. At best, these materials are chopped into large pieces which are left to lie on top of the lawn.

Finally, to my knowledge, none of the prior art mulcher attachments are adjustable so as to be adaptable for different lawn conditions in order to optimize their mulching efficiency.

It would therefore be desirable to provide an attachment for conventional lawn mowers which is capable of shredding or pulverizing lawn material into particles which are sufficiently fine so that it does not accumulate in piles, is evenly distributed across the lawn and can pass down through the grass into the soil. It would further be desirable to provide such an attachment which is adaptable to meet various types of lawn conditions and is capable of shredding or pulverizing small limbs, nuts, pinecones and the like. The present invention satisfies these needs.

SUMMARY OF THE INVENTION

In accordance with the present invention, an attachment is provided for a conventional lawn mower to effect shredding or pulverizing of lawn material. The attachment includes a closure which is removably mounted on the housing of the lawn mower over a discharge opening through which lawn cuttings are normally discharged. The closure includes an arcuate wall extending along and generally facing a portion of the path of the travel of a rotary blade which extends parallel to and is spaced from the turf. The attachment further includes a plurality of cutting members mounted on the closure wall which extend into the volume within the housing in closely spaced relationship to and generally above the cutting blade.

Each of the cutting members includes at least a first plurality of cutting elements extending respectively at successively greater distances from the blade for shredding or pulverizing the lawn material. The first plurality of cutting elements are spaced apart from each other. A second plurality of cutting elements are alternatively interspersed between and are inclined relative to the first plurality thereof. The cutting members may include several sets of the cutting elements arranged in a radial pattern and secured on the end of a bolt or similar fastener which extends through and is secured to the closure wall. The cutting members may be advantageously arranged in spaced apart groups in order to improve cutting efficiency.

In one embodiment, the closure wall includes a plurality of perforations greater in number than the number of removably mounted cutting members so that these apertures represent a plurality of choices of cutting member positions.

BRIEF DESCRIPTION OF THE DRAWINGS

In the drawings, which form an integral part of the specification and are to be read in conjunction therewith, and in which like reference numerals are employed to designate identical components in the various views:

FIG. 1 is a perspective view of a tractor-type lawn mower having the attachment of the present invention mounted thereon;

FIG. 2 is a bottom plan view of a portion of the lawn mower of FIG. 1 depicting the relationship of one of the cutting blades and the attachment of the present invention;

FIG. 3 is a view taken in the direction of the line 3—3 in FIG. 2;

FIG 4 is a sectional view taken along the line 4—4 in FIG. 3;

DESCRIPTION OF THE PREFERRED EMBODIMENTS

Figure 5:
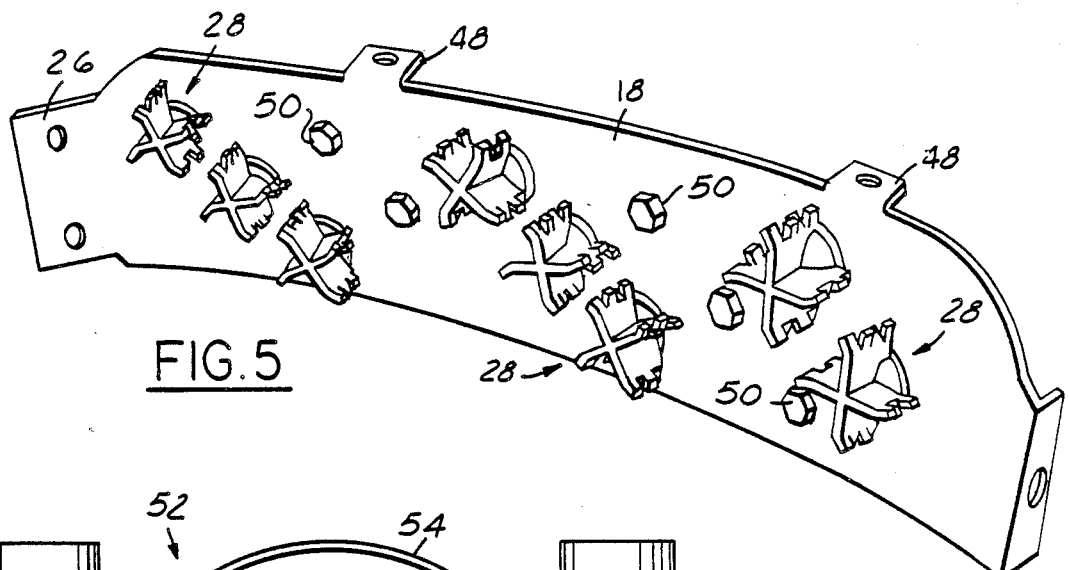
FIG. 5 is a perspective view of the attachment of the present invention, shown remove the lawn mower.

Referring first to FIGS. 1 and 2, the present invention generally relates to an attachment 18 suitable for shredding or pulverizing lawn material, which may be removably mounted on the cutting blade housing 12 of a conventional lawn mower 10. The lawn mower 10 is of the tractor, riding type; however, as will be discussed below, the attachment 18 of the present invention is well-suited for use with various other types of lawn mowers, including the typical hand-pushed or self-propelled non-riding lawn mower. The lawn mower 10 is of the type having a pair of cutting blades 14, 16 which rotate in the same direction and are respectively disposed within substantially cylindrical portions of the housing 12. The blades 14, 16 are disposed substantially parallel to and spaced above the turf of the lawn and are normally intended to cut grass or other similar lawn growth in the conventional manner. The housing 12 includes a discharge opening 15 on side thereof through which the cut lawn material is discharged. As best seen in FIG. 2, the attachment 18 includes a plurality of cutting members 28 on the inner side thereof, which are arranged in groups. These cutting elements 28 are closely spaced from the end of the cutting blade 16 so that cut lawn material and other objects, including limbs, nuts and pinecones, are propelled by the blades 14, 16 in the path of and against the cutting members 28. As will be discussed below, by nature of the configuration and placement of the cutting members 28, limbs, nuts and pinecones, as well as other comparable debris, are effectively shredded or pulverized by the cutting members 28, and the resultant, cut material is substantially uniformly distributed beneath and drops from the housing 12 onto the turf.

The attachment 18 includes an arcuately shaped plate or closure wall made of any suitable, rigid material such as steel, and is provided with a pair of mounting flanges 22, 26 which allows the attachment 18 to be mounted on the housing by means of bolt assemblies 24. More particularly, the flange 22 is configured to engage a mating flange 20 on the housing 12, and flange 26 is angled so as to conformally engage the front wall of the housing 12. A pair of mounting flanges 48 along the top edge of the closure wall are adapted to be secured to the top of the housing 12 in order to assure that the attachment 18 is securely mounted in full closing relationship over the discharge opening 15.

Referring now also to FIGS. 3–5, the cutting members 28 can be seen to be arranged in a plurality of spaced apart groups thereof, wherein the cutting members 28 in each group are arranged at successively lower elevations, relative to the path of travel of the blade. In other words, the cutting members 28 in each group thereof are effectively stair-stepped in position. This arrangement has been found to be quite effective in promoting pulverizing and shredding of the lawn material. Effectively, the blades 14, 16 produce a partial vacuum which tends to draw the lawn material upwardly from the turf toward the top of the housing. As the material is drawn upwardly, it is, of course, swirled so that the material tends to first strike the cutting member 28 having the highest elevation. As the material strikes the highest cutting member, it is partially or fully shredded or pulverized, and the continuing swirling action next impels it against the next lower cutting member 28 in that group and so on until the material is substantially pulverized or shredded and then drops onto the turf. It has also been found desirable to provide a plurality of apertures in the closure wall of the attachment 18, such apertures having bolts 50 passing therethrough, as shown in FIG. 5. These apertures are greater in number than the number of cutting members and provide a plurality of choices of positions in which to mount the cutting members in order to accommodate various lawn conditions and cutting characteristics of different lawn mowers. Thus, the number of cutting members 28 in each group may be varied, and groups may be added or deleted to suit these varying conditions.

As best seen in FIGS. 3 and 4, each of the cutting members 28 includes a plurality of cutting elements 32 which are defined on the ends of a pair of interconnected plates 34, 36 which extend transversely to each other. The cutting elements 32 on each end of one of the plates 34, 36 are arranged in two spaced apart, alternatively disposed sets which are inclined relative to each other and effectively extend radially outward from a common axis. By this arrangement, spacing is provided between adjacent cutting elements to encourage the shredding and pulverizing action, and material passing between or adjacent to the leading cutting elements 32 in each group thereof are effectively displaced and deflected by the trailing cutting elements 32 in that group. Moreover, this arrangement of cutting elements has been found to be self-cleaning and thus not subject to clogging.

The plates 34, 36 are secured by means of a weld to the head of a bolt 38 whose threaded shaft 46 extends through an aperture in the closure wall of the attachment 18. The closure wall is sandwiched between a pair of washers 42, and the assembly is secured together by means of a lock washer 43 and nut 44. It is thus evident that each cutting member 28 may be readily removed from the attachment 18 simply by unscrewing the nut 44 which in turn releases the cutting member assembly. It may also be appreciated that this mounting arrangement permits adjustment of the depth of penetration of the cutting member 28 into the housing toward the cutting blade.

Figure 6:
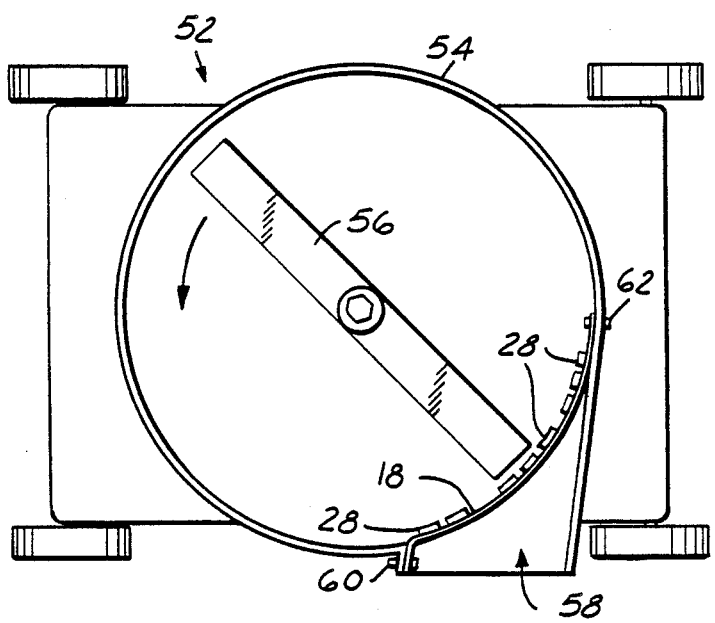
FIG. 6 is a bottom plan view of another lawn mower having a slightly modified embodiment of the attachment of the present invention mounted thereon.

As shown in FIG. 6, a slightly different embodiment of the attachment 18a is mounted on a conventional, push-type lawn mower 52 which is provided with a circular blade housing 54, conventional rotating blade 56 and a discharge opening 58 through which cut lawn material is normally discharged. The attachment 18a forms a closure over the discharge opening 58 and is mounted on the housing 54 by means of conventional bolt assemblies 60, 62.

Figure 7:
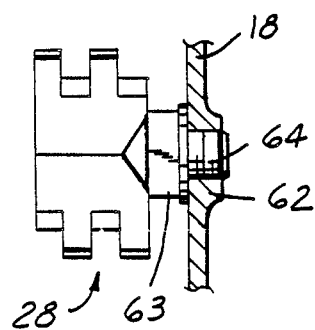
FIG. 7 is a fragmentary view, partially in section, of an ultimate embodiment of the attachment of the present invention.

Another slightly modified form of the attachment of the present invention is depicted in FIG. 7. The cutting member 28 is secured by any suitable means, such as a weld to the head 63 of a threaded stud 64. The closure wall of the attachment 18 is provided with a boss 62 having an internal thread suited to threadably receive the threaded stud 64. Thus, this embodiment eliminates the need for a nut and permits the cutting member 28 to be removed from the closure wall simply by grasping the plates 34, 36 and screwing the studs 64 out of the wall.

In use, as discussed above, the attachment 18 of the present invention is removably installed on the housing 12, 54 of the lawn mower 10, 52 using bolts and simple tools. Once installed, highly effective shredding and pulverizing of grass, leaves, small limbs and the like is achieved with great efficiency for several reasons, including: the cooperative effect of the uplifting suction created within the lawn mower housing and the placement and configuration of the cutting members 28; the nature of the cutting action and placement of the cutting members; and the particular geometry of the cutting elements themselves. Moreover, because of the configuration of the cutting elements, the cutting members do not become clogged with material. Finally, the attachment 18 is well-suited to varying configurations of lawn mowers, cutting conditions and lawns by virtue of the fact that the position of the cutting members may be readily varied, and their radial positioning relative to the blade may be easily altered.

From the foregoing, it is apparent that the lawn mower attachment of the present invention not only provides for the reliable accomplishment of the objects of the invention, but does so in a particularly effective and economical manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded thereby should be deemed to extend to the subject matter claimed and all equivalents thereof fairly within the scope of the invention.

What is claimed is:

1. For use with a lawn mower of the type including a housing, a cutting blade rotatable within the housing about a central axis for cutting the lawn and a discharge opening in the housing for allowing lawn material cut by the blade to be discharged from the housing, an attachment for shredding or pulverizing said lawn material, said attachment comprising:
   a closure removably mountable on said housing over said discharge opening for closing said discharge opening, said closure including an arcuate wall extending along and generally facing a portion of the path of travel of said blade; and,
   a plurality of cutting members on said closure wall and within said housing in closely spaced relationship to said cutting blade, each of said cutting members including at least a first plurality of cutting elements radially spaced respectively at successively greater distances from said central axis for shredding or pulverizing said lawn material.

2. The attachment of claim 1, wherein said cutting members are arranged substantially along the majority of length of said wall, in the direction of the path of travel of said blade.

3. The attachment of claim 1, wherein each of said cutting members includes at least a second plurality of cutting elements radially spaced respectively at successively greater distances from said central axis for shredding or pulverizing said lawn material.

4. The attachment of claim 3, wherein said first and second pluralities of cutting elements each extend radially from a common axis, said common axis extending transversely through said closure wall.

5. The attachment of claim 3, wherein each of said cutting members includes third and fourth pluralities of cutting elements, and said first, second, third and fourth pluralities of cutting elements each extend radially from a common axis, said common axis extending transversely through said closure wall.

6. The attachment of claim 1, wherein adjacent cutting elements in said first plurality thereof are offset from each other in the direction of the path of travel of said cutting blade.

7. The attachment of claim 1, wherein said cutting members are arranged in a plurality of groups thereof.

8. The attachment of claim 7, wherein said groups are spaced apart in the direction of the path of travel of said cutting blade.

9. The attachment of claim 1, including means for mounting said cutting members on said wall.

10. The attachment of claim 9, wherein said closure includes a plurality of apertures in said wall respectively representing a plurality of choices of mounting positions of said cutting members on said wall, the number of said apertures being greater than the number of said cutting members, said cutting members being mounted at locations on said wall corresponding to selected ones of said apertures wherein said mounting means extend through the selected ones of said apertures.

11. The attachment of claim 7, wherein the cutting members in at least one group thereof are arranged in spaced relationship to each other in the direction of path of travel of said cutting blade.

12. A shredding and pulverizing attachment for a lawn mower of the type having a housing and a cutting blade, said cutting blade being disposed generally parallel to the turf and rotatable within the housing for cutting lawn material, said attachment comprising:
   structure mounted on said housing and defining a wall extending around a portion of said blade; and
   a plurality of cutting members mounted on said wall structure and extending toward said blade, each of said cutting members including at a first pair of spaced apart cutting elements and a second pair of spaced apart cutting elements alternately disposed and inclined with respect to said first pair of cutting elements.

13. The attachment of claim 12, wherein each of said cutting members includes at least a second pair of spaced apart cutting elements alternately disposed and inclined with respect to said first pair of cutting elements.

14. The attachment of claim 12, wherein said cutting members are arranged in spaced apart groups thereof.

15. A cutter for use in shredding or pulverizing lawn material, comprising:
   a plurality of stationary cutting members each extending radially from a central axis and including at least one cutting element,
   said cutting members being defined by first and second interconnected plates, wherein there is at least one cutting element on each end of said first plate and there is at least one cutting element on each end of said second plate.

16. The cutter of claim 15, wherein said cutting members are connected to each other substantially at said reference axis.

17. The cutter of claim 1, wherein each of the cutting members on the opposite ends of said first plate includes a plurality of said cutting elements.

18. The cutter of claim 17, wherein the cutting elements for each of the cutting members on said first plate include at least two cutting elements which are inclined relative to each other.

19. The cutter of claim 18, wherein said cutting elements are formed integral with said first plate.

20. The cutter of claim 1, including a mounting element and wherein said first plate is secured to said mounting element.

21. A cutter for use in shredding or pulverizing lawn material, comprising:
   a plurality of stationary cutting members each extending radially from a central axis and including at least one cutting element,
   said cutting members being defined by first and second plates with at least one of said cutting elements on each end of the first and second plates.

* * * * *